(12) United States Patent
Zhang et al.

(10) Patent No.: US 10,057,937 B2
(45) Date of Patent: Aug. 21, 2018

(54) COMMUNICATIONS VIA MULTIPLE ACCESS POINTS

(71) Applicant: NOKIA SOLUTIONS AND NETWORKS OY, Espoo (FI)

(72) Inventors: Yanji Zhang, Beijing (CN); Yang Liu, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 147 days.

(21) Appl. No.: 15/307,855

(22) PCT Filed: May 2, 2014

(86) PCT No.: PCT/CN2014/076695
§ 371 (c)(1),
(2) Date: Oct. 31, 2016

(87) PCT Pub. No.: WO2015/165120
PCT Pub. Date: Nov. 5, 2015

(65) Prior Publication Data
US 2017/0064769 A1   Mar. 2, 2017

(51) Int. Cl.
*H04W 4/00* (2018.01)
*H04W 76/27* (2018.01)
(Continued)

(52) U.S. Cl.
CPC .......... *H04W 76/27* (2018.02); *H04W 76/15* (2018.02); *H04W 76/25* (2018.02); *H04W 76/38* (2018.02)

(58) Field of Classification Search
CPC ..... H04W 76/27; H04W 76/38; H04W 76/25; H04W 76/15
(Continued)

(56) References Cited

U.S. PATENT DOCUMENTS

2002/0172178 A1* 11/2002 Suzuki ................. H04W 76/38
370/338
2006/0094450 A1* 5/2006 Park ................... H04W 52/0225
455/458
(Continued)

FOREIGN PATENT DOCUMENTS

CN    102237936 A    11/2011

OTHER PUBLICATIONS

International Search Report dated Feb. 11, 2015 corresponding to International Patent Application No. PCT/CN2014/076695.
(Continued)

*Primary Examiner* — Sai Ming Chan
(74) *Attorney, Agent, or Firm* — Squire Patton Boggs (US) LLP (57) ABSTRACT

Methods and apparatuses for controlling communication with a communication device connected to a plurality of access points are described. Predefined inactivity in communications between a first access point and the communication device may be determined at the first access point. An indication of predefined inactivity in communications between the communication device and a second access point may be provided by the second access point. Connectivity state of the communication device is only changed when said predefined inactivity in communications between the first access point and the communication device has been determined and said indication has been provided.

20 Claims, 7 Drawing Sheets

(51) Int. Cl.
   *H04W 76/38* (2018.01)
   *H04W 76/25* (2018.01)
   *H04W 76/15* (2018.01)
(58) Field of Classification Search
   USPC ........................................................ 370/329
   See application file for complete search history.

(56) References Cited

U.S. PATENT DOCUMENTS

2009/0285166 A1* 11/2009 Huber ................ G06Q 20/1235
                                                          370/329
2013/0301418 A1    11/2013 Ding
2014/0056243 A1     2/2014 Pelletier et al.

OTHER PUBLICATIONS

Alcatel-Lucent Shanghai Bell et al., "Discussion on the RRC protocol supporting dual connectivity," 3GPP Draft; R2-131352, 3GPP TSG RAN WG2 Meeting #81bis, Chicago, IL, USA, Apr. 15-19, 2013, 3 pages.
Alcatel-Lucent, "Discussion on inter-frequency small cell deployment and dual connectivity support," 3GPP Draft; R2-131353, 3GPP TSG RAN WG2 Meeting #81bis, Chicago, IL, USA, Apr. 15-19, 2013, 4 pages.
Asustek, "Discussion on dual connectivity for small cell," 3GPP Draft; R2-130292, 3GPP TSG-RAN WG2 Meeting #81, St. Julian's, Malta, Jan. 28-Feb. 1, 2013, 3 pages.
European Search Report application No. 14890934.4 dated Nov. 30, 2017.

* cited by examiner

COMMUNICATIONS VIA MULTIPLE ACCESS POINTS

This disclosure relates to communications in wireless systems and more particularly communications via multiple access points with a wireless communication device.

A communication system can be seen as a facility that enables communications between two or more nodes such as fixed or mobile communication devices, access points such as base stations, servers, machine type devices and so on. A communication system and compatible communicating entities typically operate in accordance with a given standard or specification which sets out what the various entities associated with the system are permitted to do and how that should be achieved. For example, the standards, specifications and related protocols can define the manner how communications between communication devices and the access points shall be arranged, how various aspects of the communications shall be provided and how the equipment shall be configured.

Signals can be carried on wired or wireless carriers. Examples of wireless systems include public land mobile networks (PLMN), satellite based communication systems and different wireless local networks, for example wireless local area networks (WLAN). Wireless systems can be divided into coverage areas referred to as cells, and hence the wireless systems are often referred to as cellular systems. An access node, for example a base station can provide one or more cells, there being various different types of base stations and cells. Third Generation Partnership Project (3GPP) Long Term Evolution (LTE) standard refers to base stations by the terms NodeB (NB) and enhanced NodeB (eNodeB: eNB).

A user can access a communication system via one or more access nodes by means of an appropriate communication device or terminal. Typically a communication device is used for enabling receiving and transmission of communications such as speech and data. A communication device is provided with an appropriate signal receiving and transmitting arrangement for enabling communications with other parties. The communication device may access a carrier provided by a base station, and transmit and/or receive communications on the carrier. Communication devices of users are often referred to as user equipment (UE).

Dual connectivity has been proposed as a possible higher layer enhancement. In dual connectivity a device such as a UE can be simultaneously connected with a master access node (e.g. master eNB; MeNB) and a secondary access node (e.g. a secondary eNB; SeNB). Advantages of dual connectivity include gains in throughput and mobility robustness. Currently dual connectivity is considered to be particularly advantageous for small cells.

Figure 3:
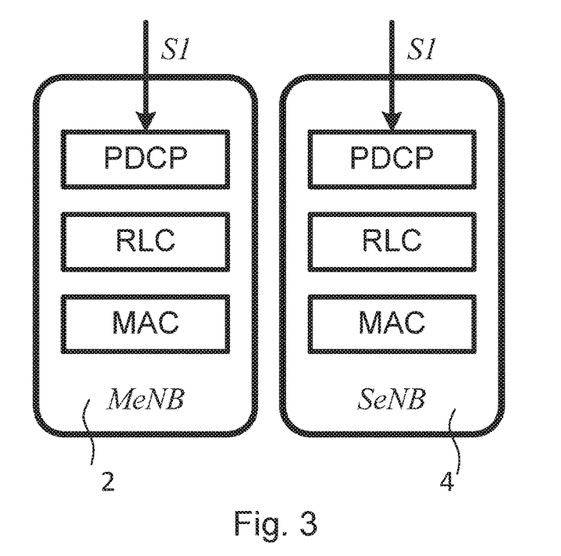
FIG. 3 shows a schematic presentation of access nodes of a multi-connectivity scheme.

A single radio resource control (RRC) between a MeNB and a UE has been agreed as a baseline assumption for control plane architecture for dual connectivity. In LTE S1 interface is a standardized interface between eNB and an Evolved Packet Core (EPC) where user plane interface S1-U is for transport of user datagrams between an eNB and a serving gateway (S-GW). In accordance with a possible user plane architecture supporting user plane data split options S1-U terminates in SeNB in addition to MeNB. This is shown in FIG. 3. A secondary cell group (SCG) bearer can be served by the SeNB alone. In LTE specifications this scheme is known as alternative 1A.

For a system where UE has single connection with the network, after successful establishment of the connection, data transmission can begin. The RRC connection will be released if the eNB discovers that there has been no user plane traffic transmission between UE and network for a certain period of time based on a value defined for user inactivity timer. However, in dual connectivity mode, for schemes such as user plane alternative 1A, the MeNB does not know for certain if there is any user plane traffic of the SCG bearer because the packet data of the SCG bearer can be transferred between a serving gateway (S-GW) and the UE by passing the data through the SeNB. The existing user inactivity detection mechanism is thus not considered adequate for dual connectivity mode as it may lead to wrong and/or non-optimal state transition decisions. For example, the eNB may release the RRC connection with the UE due to determined lack of data transmission between the UE and the MeNB while data transmission may still be ongoing between the UE and SeNB/S-GW. This can cause an interruption of user traffic. On the other hand, the MeNB may keep the UE in connected mode even when there is no data traffic in either the MeNB or the SeNB, and as a result, resource utilization efficiency can be degraded.

It is noted that the above discussed issues are not limited to any particular communication environment and station apparatus but may occur in any appropriate system.

Embodiments of the invention aim to address one or several of the above issues.

In accordance with an embodiment there is provided a method for controlling communication with a communication device connected to a plurality of access points, the method comprising determining predefined inactivity in communications between a first access point and the communication device, receiving an indication of predefined inactivity in communications between the communication device and a second access point, and changing the connectivity state of the communication device when said predefined inactivity in communications between the first access point and the communication device has been determined and said indication has been received.

In accordance with an embodiment there is provided a method for controlling communications with a communication device connected to a plurality of access points, the method comprising determining predefined inactivity in communications between a second access point and the communication device, sending an indication of the determined predefined inactivity to a first access point for use in determination whether to change the connectivity state of the communication device, and waiting for information regarding the connectivity state of the communication device.

In accordance with an embodiment there is provided an apparatus for controlling communications with a communication device connected to a plurality of access points, the apparatus comprising at least one processor, and at least one memory including computer program code, wherein the at least one memory and the computer program code are configured, with the at least one processor, to determine predefined inactivity in communications between a first access point and a communication device, determine an indication of predefined inactivity in communications between the communication device and a second access point, and change the connectivity state of the communication device when said predefined inactivity in communications between the first access point and the communication device and said indication have been determined.

In accordance with an embodiment there is provided an apparatus for controlling communications with a communication device connected to a plurality of access points, the apparatus comprising at least one processor, and at least one memory including computer program code, wherein the at least one memory and the computer program code are configured, with the at least one processor, to determine predefined inactivity in communications between a second access point and a communication device, send an indication of the determined predefined inactivity to a first access point for use in determination whether to change the connectivity state of the communication device, and wait for information regarding a change in the connectivity state of the communication device.

In accordance with a more specific embodiment determining of predefined inactivity comprises determining expiry of an inactivity timer.

The first access point can comprise a master access point and the second access point a secondary access point for a communication device in dual connectivity mode. In specific embodiments the communications device is connected to a master and a secondary NodeB.

Subsequent to communication of the indication of predefined inactivity and before a change of the connectivity state, an indication of resumed activity in communications between the communication device and the second access point may be communicated. In response to the indication of resumed activity, the first access point can ignore the indication of predefined inactivity thereof.

The first access point can be configured to restart an inactivity timer function thereof when no indication of predefined inactivity has been received from the second access point by the expiry of the inactivity timer function and resumed activity in communications between the first access point and the communication device is determined.

Change of connectivity state can comprise release of radio resource control connection by the first access point.

Communications between the access points and the communication device can comprise user plane communications of packet data.

A computer program comprising program code means adapted to perform the herein described methods may also be provided. In accordance with further embodiments apparatus and/or computer program product that can be embodied on a computer readable medium for implementing at least one of the above methods is provided.

A network node such as a base station or a controller entity for controlling communications can be configured to operate in accordance with at least some of the embodiments. A communication system embodying the apparatus and principles of the invention may also be provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained with reference to a wireless or mobile communication system serving mobile communication devices.

Figure 1:
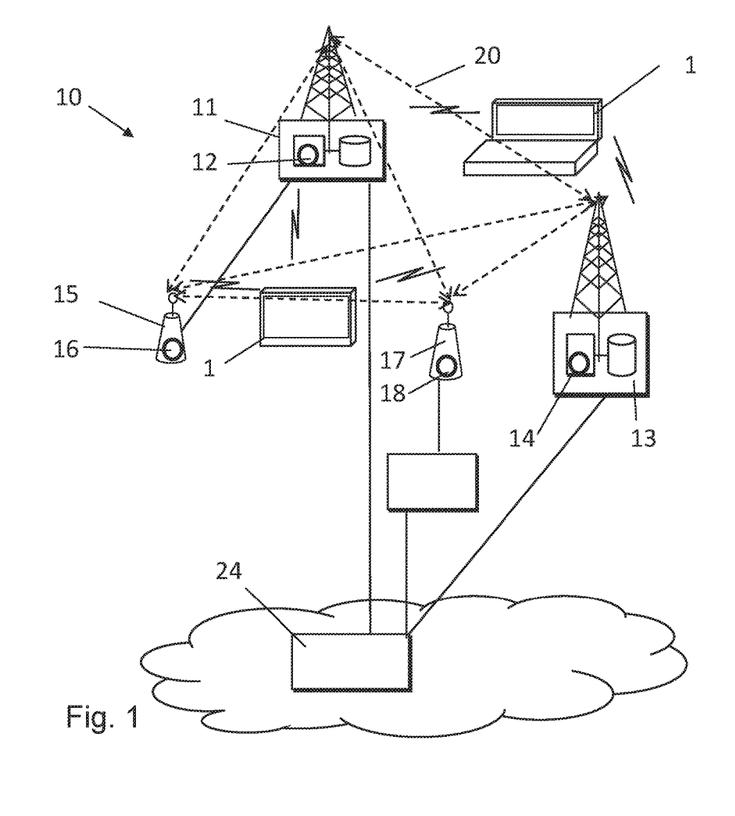
FIG. 1 shows a schematic diagram of a cellular system where certain embodiments can be implemented.

Before explaining in detail the exemplifying embodiments, certain general principles of a wireless communication system, access systems thereof, and mobile communication devices are briefly explained with reference to FIGS. 1 and 2 to assist in understanding the technology underlying the described examples.

A non-limiting example of the recent developments in communication system architectures is the long-term evolution (LTE) of the Universal Mobile Telecommunications System (UMTS) that is being standardized by the 3rd Generation Partnership Project (3GPP). The LTE employs a mobile architecture known as the Evolved Universal Terrestrial Radio Access Network (E-UTRAN). Base stations of such systems are known as evolved or enhanced Node Bs (eNodeBs; eNBs) and may provide E-UTRAN features such as user plane Radio Link Control/Medium Access Control/Physical layer protocol (RLC/MAC/PHY) and control plane Radio Resource Control (RRC) protocol terminations towards communication devices. Other examples of radio access nodes include those provided based on technologies such as wireless local area network (WLAN) and/or WiMax (Worldwide Interoperability for Microwave Access).

Communication devices or terminals 1 can be provided wireless access via base stations or similar wireless transmitter and/or receiver nodes providing radio service areas or cells. FIG. 1 shows four base stations 11, 13, 15 and 17, but it is noted that these are shown only for illustration purposes and that a larger or smaller number of base stations sites may be provided. A base station site can also provide more than one cell or sector. A sector may provide a cell or a subarea of a cell. Thus it shall be appreciated that the number, size and shape of cells may vary considerably.

Base stations and hence communications in cells are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. For example, in LTE control apparatus of a given eNB can control several cells.

Different types of possible cells include those known as macro cells, pico cells and femto cells. For example, transmission/reception points or base stations can comprise wide area network nodes such as a macro eNode B (eNB) which may, for example, provide coverage for an entire cell or similar radio service area. Base station can also be provided by small or local radio service area network nodes, for example Home eNBs (HeNB), pico eNodeBs (pico-eNB), or femto nodes. Some applications utilise radio remote heads (RRH; denoted by 15 in the example) that are connected to for example an eNB (denoted by 11 in the example).

Base stations and associated controllers may communicate via each other via fixed line connection and/or air interface. The logical connection between the base station nodes can be provided for example by an X2 interface. In FIG. 1 this interface is shown by the dashed line denoted by 20.

The communication devices 1 may comprise any suitable device capable of at least receiving wireless communication of data. For example, the terminals can be handheld data processing devices equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewellery and so on, universal serial bus (USB) sticks with wireless capabilities, modem data cards or any combinations of these or the like. Communication devices of users are often referred to as user equipment (UE).

Figure 2:
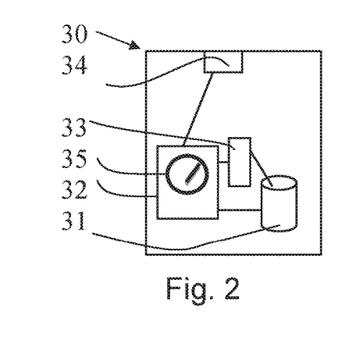
FIG. 2 shows a schematic diagram of a control apparatus according to some embodiments.

FIG. 2 shows an example of a control apparatus for a node, for example to be integrated with, coupled to and/or otherwise for controlling any of the base stations. The control apparatus 30 can be arranged to provide control on communications in the service area of a base station site. The control apparatus 30 can be configured to provide control functions in association with multilink communications in accordance with certain embodiments described below. For this purpose the control apparatus comprises at least one memory 31, at least one data processing unit 32, 33 and an input/output interface 34. Via the interface the control apparatus can be coupled to at least one receiver and at least one transmitter of the base station. The control apparatus can be configured to execute an appropriate software code to provide the control functions. It shall be appreciated that similar components can be provided in a control apparatus provided elsewhere in the system, for example in entity 24 of FIG. 1.

Figure 4:
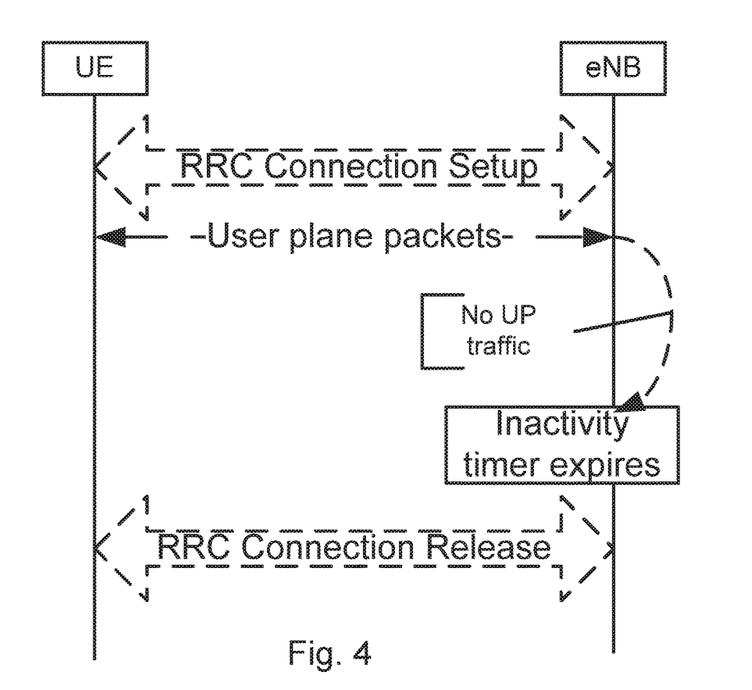
FIG. 4 is a chart illustrating operation of an inactivity timer in an access node.

The control apparatus further comprises at least one timer function 35. The timer function is configured for use in determining activity status of mobile devices connected with the access point under control of the controller apparatus 30. Thus a node providing an access point can be provided with an inactivity timer. FIG. 1 shows timers 12, 14, 16 and 18 of the respective access nodes 11, 13, 15 and 17. For example, an inactivity timer of an eNB can be configured to control how long a RRC connection is maintained. The eNB is configured to release the RRC Connection when the inactivity timer expires. A procedure for the release operation is shown by the chart of FIG. 4.

This operation is changed in the examples such that when a communication device is connected with a more than one access point, for example is in dual connectivity mode illustrated by FIG. 3, an inactivity timer function is provided in both the master access node 2 and the secondary access node 4 of FIG. 2. The arrangement is such that the master access node 2 can take user plane traffic transmission status in the secondary access node 4 into account before making decision to release the communication device. The connection control is provided by the master access node and thus after communication of an inactivity indication the secondary access node can simply wait for further commands from the master access node.

Figure 5:
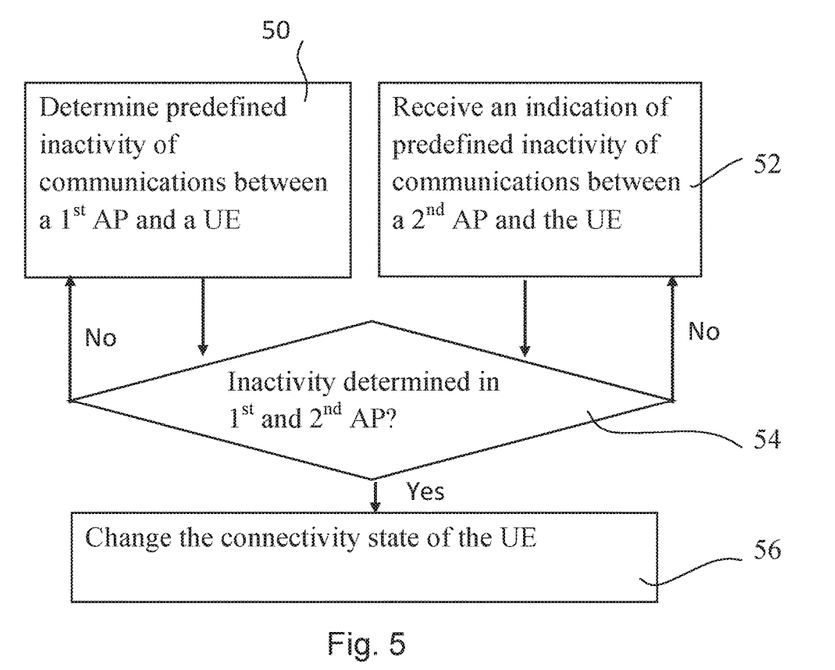
FIGS. 5 and 6 are flowcharts in accordance with certain examples.

FIG. 5 shows flowchart for a method for controlling connectivity state of a communication device connected to a plurality of access points (AP). In the method predefined inactivity in communications between a first access point and the communication device is determined at 50. In addition, an indication of predefined inactivity in communications between the communication device and a second access point is received at 52 from the second access point. The connectivity state of the communication device is then changed at 56 only when said predefined inactivity in communications between the first access point and the communication device and said indication have been determined at 54. If both conditions are not satisfied, the method will revert to monitoring of the conditions and no change is effected on the connectivity state.

Figure 6:
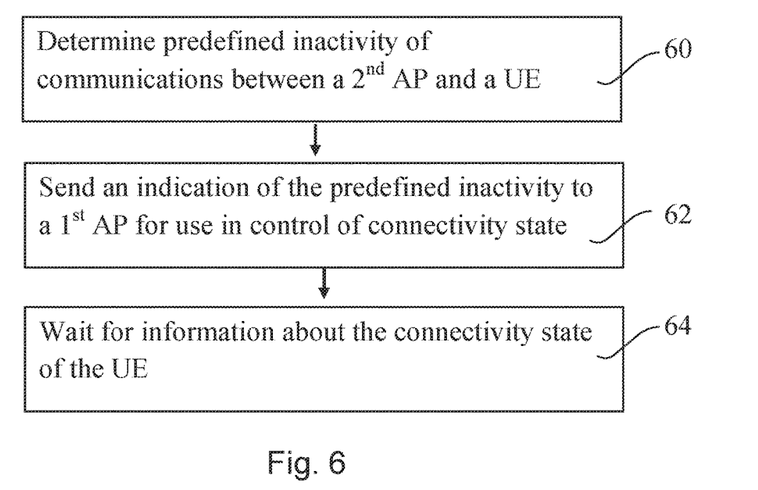

FIG. 6 illustrates an example of operation at the second access point. Predefined inactivity in communications between the second access point and the communication device can be determined at 60. An indication of the determined predefined inactivity is sent at 62 to the first access point for use in determination whether to change the connectivity state of the communication device. The second access point can then wait at 64 for information regarding the connectivity state of the communication device. For example, the first access point can send instructions that connections to the communications are to be released. Before the release the second access point can monitor the activity state of the communications device, and if there is a change, inform the first access point accordingly. An option is to refrain from communications with the communication device during this period.

The first access point can be a master access point receiving appropriate signalling from a secondary access point. If both conditions are satisfied, the master access point then releases its connection with the communication device. The master access point can also inform the secondary access point of the release and/or explicitly command connection release by the second access point.

For example, in arrangements where a SeNB has no RRC connection with the UE, the SeNB can wait after sending inactivity indication to the MeNB for a potential request from the MeNB. For example, the MeNB can send a SeNB release request in case a RRC connection release is determined as an appropriate action.

FIGS. 7 to 10 show more particular examples of various scenarios where a MeNB and a SeNB maintain separate user inactivity timers for a dual connectivity UE. The inactivity timer of the MeNB is called in these examples M_inactivityTimer and the inactivity timer of the SeNB is called S_inactivityTimer. Appropriate signaling is provided between the eNBs for communication of status information. For example, X2AP messages can be defined to indicate the user plane traffic status (active or inactive) by the SeNB to the MeNB. The control apparatus of the MeNB can be configured to determine that there is no user traffic for a particular UE only after determination of expiration of M_inactivityTimer and receiving a user inactivity indication from the SeNB. The SeNB can be configured to send the user inactivity indication to the MeNB after S_inactivityTimer expires.

If the RRC connection is not yet released by the MeNB (there is no connect to idle mode transition) after a user inactivity indication has been sent to the MeNB the SeNB can send a user activity indication to the MeNB once there is user plane traffic again.

Figure 7:
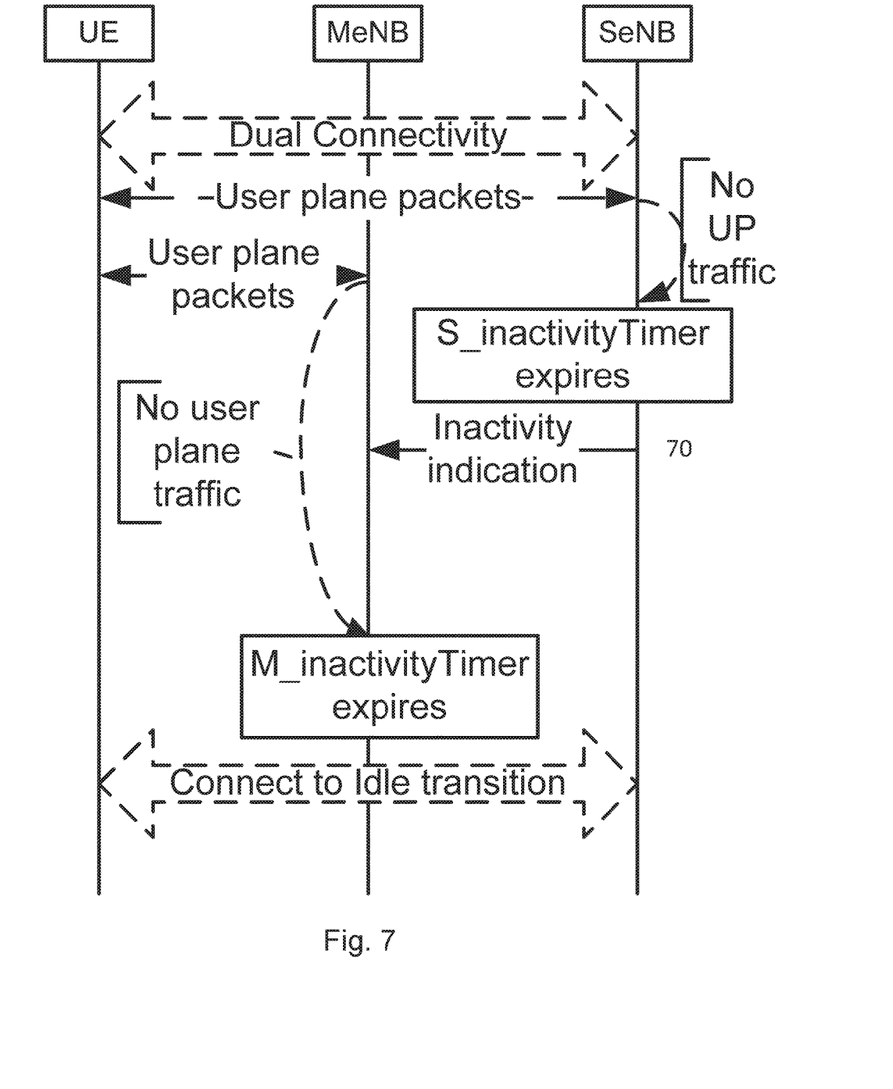
FIGS. 7 to 10 show various exemplifying scenarios.

In the scenario shown in FIG. 7, a MeNB can trigger RRC Connection Release procedure only after the expiration of M_inactivityTimer and receiving user inactivity indication 70 from SeNB which has been signalled in response to the S_inactivityTimer expiry. In this scenario the SeNB timer has expired first, triggering the inactivity indication and the MeNB can release the RRC connection after the M_inactivityTimer thereof expires.

Figure 8:
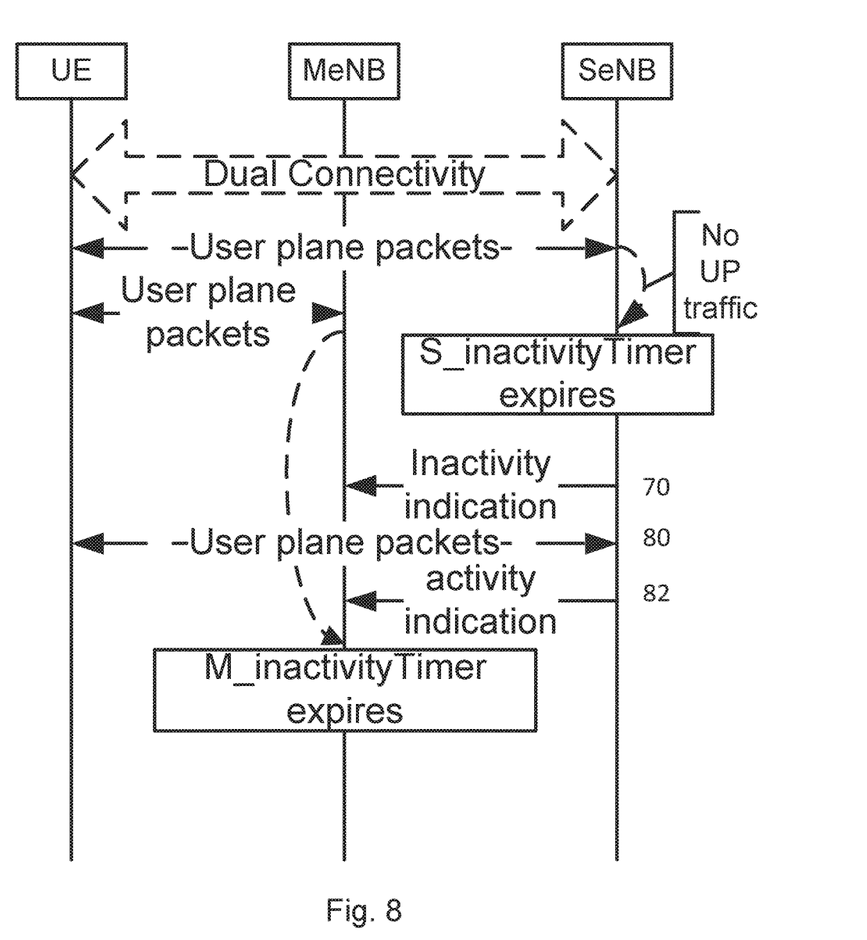

Another scenario is shown in FIG. 8. When S_inactivityTimer of SeNB expires, the SeNB sends user inactivity indication 70 to MeNB. Because of this the MeNB can be prepared to release the connection. However, there can be further user plane traffic at 80 in the SeNB before the RRC connection is released. In this case the SeNB can send an activity indication 82 to the MeNB to prevent release of the RRC. In response to the activity indication the MeNB will not release the RRC connection due to ongoing user plane traffic between the UE and SeNB.

Figure 9:
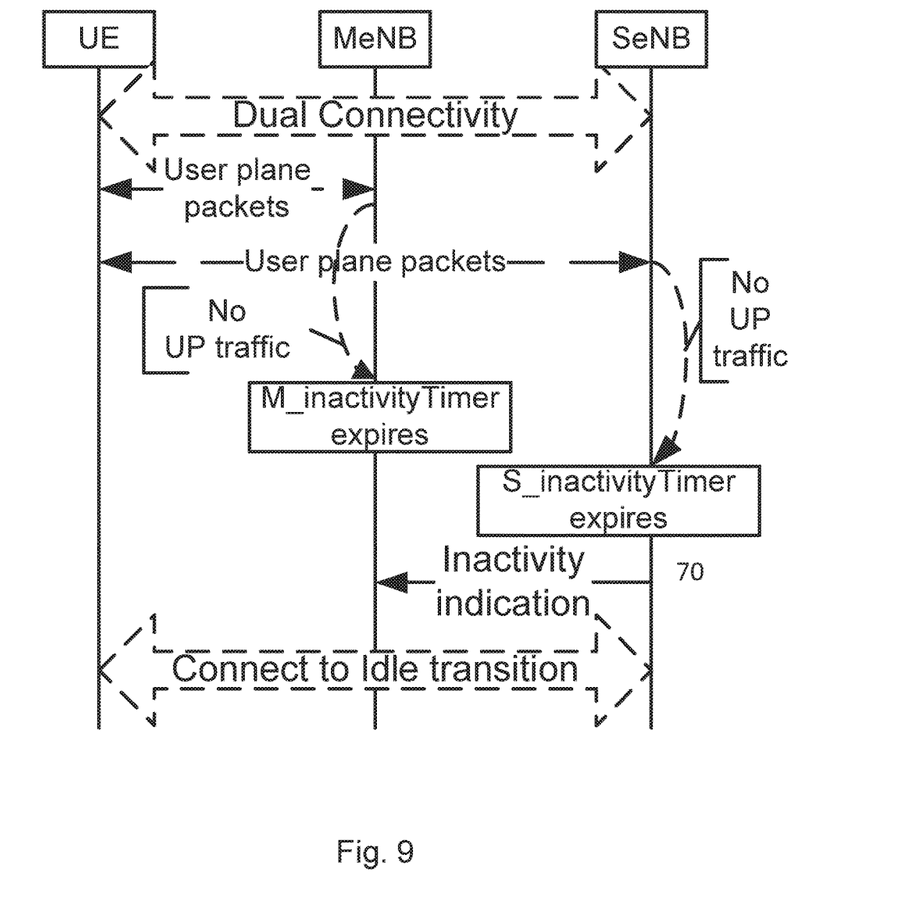

FIG. 9 relates to handling of expiration of M_inactivity-Timer in scenario where M_inactivityTimer expires first. In this case the MeNB does not release the RRC connection in response to the expiry of its timer but needs to wait until a user inactivity indication 70 is received from the SeNB.

Figure 10:
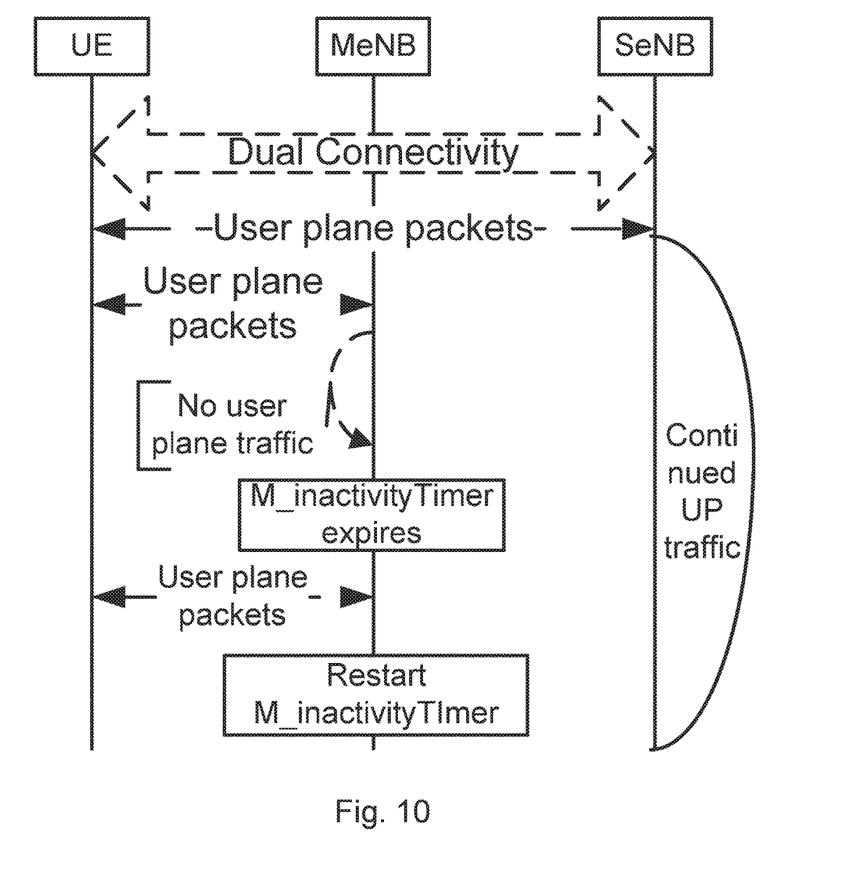

In another scenario shown in FIG. 10 M_inactivityTimer expires but there is continuing traffic between the SeNB and the UE. After M_activityTimer expires a7 100, the MeNB restarts the M_inactivityTimer at 102 if there is user plane traffic with MeNB and therefore no user inactivity indication has been received from the SeNB. The MeNB will not release RRC connection without receiving any indication message from SeNB as the MeNB can be configured to always assume in such situations ongoing data transmission. FIG. 10 also shows the possibility of communication of user plane packets between the MeNB and the UE after expiry of the timer.

By means of coordination between MeNB and SeNB, the MeNB can be provided with up-to-date user traffic status of SeNB for user plane for scenarios such as the LTE user plane option 1A. The MeNB can use this information to control the RRC state transition more efficiently. Also, unnecessary use of resources caused by staying in connected mode or user application traffic interruption caused by unnecessary state transitions may be avoided. Overall, better responsiveness to the actual traffic situation in the involved access nodes may be provided.

It is noted that whilst embodiments have been described in relation to LTE and particular components and architectures thereof, similar principles can be applied to any other communication system where communications can be provided via multiple access points or indeed to further developments with LTE. Instead of carriers provided by base stations at least one of the carriers may be provided by a mobile communication device. For example, this may be the case in application where no fixed equipment provided but at least a part of communications is provided by means of mobile equipment, for example in adhoc networks or other mobile stations that can act as a base or relay station and/or communicate directly with each other. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method for controlling communication with a communication device connected to a plurality of access points, the method comprising:
    determining predefined inactivity in communications between a first access point and the communication device,
    receiving an indication of predefined inactivity in communications between the communication device and a second access point, and
    changing the connectivity state of the communication device when said predefined inactivity in communications between the first access point and the communication device has been determined and said indication has been received.

2. A method for controlling communications with a communication device connected to a plurality of access points, the method comprising:
    determining predefined inactivity in communications between a second access point and the communication device,
    sending an indication of the determined predefined inactivity to a first access point for use in determination whether to change the connectivity state of the communication device, and
    waiting for information regarding the connectivity state of the communication device.

3. A method according to claim 1, wherein the determining of predefined inactivity comprises determining expiry of an inactivity timer.

4. A method according to claim 2, wherein the first access point comprises a master access point and the second access point comprises a secondary access point for the communication device in dual connectivity mode.

5. A method according to claim 1, comprising communicating, subsequent to communication of the indication of predefined inactivity and before a change of the connectivity state, an indication of resumed activity in communications between the communication device and the second access point.

6. A method according to claim 5, wherein, in response to the indication of resumed activity, the first access point ignores the indication of predefined inactivity thereof.

7. A method according to claim 1, wherein the first access point restarts an inactivity timer function thereof when no indication of predefined inactivity has been received from the second access point by the expiry of the inactivity timer function and resumed activity in communications between the first access point and the communication device is determined.

8. A method according to claim 2, wherein the change of the connectivity state comprises release of radio resource control connection by the first access point.

9. A method according to claim 1, wherein communications between the access points and the communication device comprises user plane communications of packet data.

10. An apparatus for controlling communications with a communication device connected to a plurality of access points, the apparatus comprising at least one processor, and at least one memory including computer program code, wherein the at least one memory and the computer program code are configured, with the at least one processor, to
  determine predefined inactivity in communications between a first access point and a communication device,
  determine an indication of predefined inactivity in communications between the communication device and a second access point, and
  change the connectivity state of the communication device when said predefined inactivity in communications between the first access point and the communication device and said indication have been determined.

11. An apparatus for controlling communications with a communication device connected to a plurality of access points, the apparatus comprising at least one processor, and at least one memory including computer program code, wherein the at least one memory and the computer program code are configured, with the at least one processor, to
  determine predefined inactivity in communications between a second access point and a communication device,
  send an indication of the determined predefined inactivity to a first access point for use in determination whether to change the connectivity state of the communication device, and
  wait for information regarding change in the connectivity state of the communication device.

12. An apparatus according to claim 10, the apparatus being configured to determine the predefined inactivity from expiry of an inactivity timer.

13. An apparatus according to claim 10, wherein the first access point comprises a master access point and the second access point comprises a secondary access point for the communication device in dual connectivity mode.

14. An apparatus according to claim 10, the apparatus being configured to communicate, subsequent to communication of the indication of predefined inactivity and before a change of the connectivity state, an indication of resumed activity in communications between the communication device and the second access point.

15. An apparatus according to claim 10, configured to, in response to the indication of resumed activity from the second access point, ignore the indication of predefined inactivity of the second access node.

16. An apparatus according to claim 10, configured to restart an inactivity timer function thereof when no indication of predefined inactivity has been received from the second access point by the expiry of the inactivity timer function and resumed activity in communications between the first access point and the communication device is determined.

17. An apparatus according to claim 10, wherein the change of connectivity state comprises release of radio resource control connection by the first access point.

18. An apparatus according to claim 11, wherein the first access point comprises a master access point and the second access point comprises a secondary access point for the communication device in dual connectivity mode.

19. An apparatus according to claim 11, wherein the change of the connectivity state comprises release of radio resource control connection by the first access point.

20. A computer program embodied on a non-transitory computer-readable medium, said program comprising code means adapted to perform the steps of claim 1 when the program is run on processor apparatus.

* * * * *